UNITED STATES PATENT OFFICE.

ALBERT P. G. DAUMESNIL, OF PARIS, FRANCE.

IMPROVEMENT IN PRODUCTS AND METHODS OF COATING AND PRESERVING METALS.

Specification forming part of Letters Patent No. 208,674, dated October 8, 1878; application filed May 20, 1878; patented in France, March 14, 1878.

*To all whom it may concern:*

Be it known that I, ALBERT PAUL GEORGES DAUMESNIL, of Paris, France, have invented Products and Methods for Coating and Preserving Metals; and I do hereby declare that the following is a full, clear, and exact description of the same.

My invention consists in new products designed for coating pieces of metal of any form and size, in the methods of using these products, and in their various applications.

For obtaining the product take about two pounds of borate of lead and crush it in a mill—for instance, of the same arrangement as those used in the manufacture of Sèvres for crushing vitrifiable colors. This crushing is operated with water, and sufficiently long to obtain the product greatly divided, and that it may readily be kept in suspense in the water without necessity to agitate it too often. When the crushing has reached this stage the whole is collected in a vessel sufficiently large to contain about three and one-half pints of water, leaving it to settle, in order to take off the water having been used for the crushing. Then take four-tenths ounce of chloride-of-platina crystals, which is dissolved in one and three-fourths pint of distilled water. After complete dissolution four-fifths pint of ammonia in small quantities is poured on this dissolution, and the whole is agitated thoroughly by means of a glass spatula. The platina, by the contact with the ammonia, precipitates as a brown matter greatly divided. The precipitate is left to settle for three hours. Then the ammoniacal water is decanted, and pure water substituted therefor. The whole is now agitated with the spatula, then left to subside a second time for three hours, and when again decanted, the platina thus obtained is mixed with the borate of lead.

In order to mix the two products thoroughly the whole is again put into the crushing-machine, where it is mixed during half an hour at least; then add about eight and one-half pints of water, when the product is ready for use.

In order to use the product, dip into the composition, after having them sufficiently brushed or washed, the pieces of steel, cast-iron, copper, or other metals it is desired to protect; then the pieces so steeped are placed in a muffle of sheet-iron strongly heated. The fire is continued till the coating (from white as it was) has become the black dull color of iron. At this stage the operation is finished, and the pieces are withdrawn from the muffle and left to cool.

It is to be well understood that I do not limit myself to the proportions, manipulation, and method of use above described.

The same results may be obtained by modifying the quantities or proportions above specified of the borate of lead or of the platina, and by substituting to the use of this latter one of its congenerics or metal of the same section— as, for instance, palladium, osmium, iridium, or others; but I have preferably spoken of the platina because its price is less.

My product, again, may be used by coating, by the aid of a brush, the large pieces of metal it might be difficult to immerse, and then throwing on this coating the flame of a jet of gas of a proper temperature.

The borate of lead is likely to attack the metal submitted to the operation, to bring one part of it into fusion, and to assist, by this fusion, the mixing of the platina with this metal. In this transformation the borax disappears partly, and there remains on the surface of the coated pieces only a mixture or an alloy of lead, platina, and metal to be preserved, this alloy or mixture forming a protecting covering or coating against oxidizement.

I claim—

The composition herein described for coating metals, the same consisting of borate of lead, chloride-of-platina crystals, ammonia, and water, in substantially the proportions specified.

ALBERT PAUL GEORGES DAUMESNIL.

Witnesses:
 ROBT. M. HOOPER,
 EUGÈNE HÈBERT.